(12) United States Patent
Namineni et al.

(10) Patent No.: US 10,096,176 B1
(45) Date of Patent: Oct. 9, 2018

(54) SYSTEM AND METHOD FOR VEHICLE-RESERVATION RELIABILITY PROGNOSIS

(71) Applicant: GM GLOBAL TECHNOLOGY OPERATIONS LLC, Detroit, MI (US)

(72) Inventors: Pavan K. Namineni, Ann Arbor, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/589,208

(22) Filed: May 8, 2017

(51) Int. Cl.
G07C 5/00 (2006.01)
G06Q 10/02 (2012.01)
G07C 5/08 (2006.01)
G06Q 30/06 (2012.01)

(52) U.S. Cl.
CPC ............. *G07C 5/008* (2013.01); *G06Q 10/02* (2013.01); *G06Q 30/0645* (2013.01); *G07C 5/0808* (2013.01)

(58) Field of Classification Search
CPC ...... G07C 5/008; G07C 5/0808; G06Q 10/02; G06Q 30/0645

USPC ................. 701/31.4; 705/307; 340/5.42, 988
See application file for complete search history.

(56) References Cited

U.S. PATENT DOCUMENTS

2016/0093216 A1* 3/2016 Lee ....................... H04W 4/046
340/870.11
2016/0321566 A1* 11/2016 Liu ........................ G06Q 10/02

* cited by examiner

*Primary Examiner* — Marthe Y Marc-Coleman

(57) ABSTRACT

A system to implement a vehicle-reservation reliability prognosis prior to a reservation is herein presented. The system includes a memory, controller, and vehicle. The memory is configured to have one or more executable instructions and one or more vehicle-share records. The controller is configured to execute the executable instructions and communicate with the vehicle-share records. The vehicle includes one or more vehicle systems configured to generate system function information and is configured to communicate with the controller. Moreover, the executable instructions enable the controller to: retrieve system function information from one or more vehicle systems of the vehicle; deliver the vehicle-reservation reliability prognosis based, at least in part, on the system function information; and modify the vehicle-share records based upon the vehicle-reservation reliability prognosis.

18 Claims, 5 Drawing Sheets

SYSTEM AND METHOD FOR VEHICLE-RESERVATION RELIABILITY PROGNOSIS

INTRODUCTION

Vehicle sharing and self-serve vehicle rental services allow consumers to make reservations for station-based use of vehicles, particularly in urban environments. These rental vehicles are often located in reserved parking spots identified with mounted signs or markers. To gain vehicle access, consumers make a reservation through their mobile device. At the beginning of the reservation, furthermore, the consumer need only be in proximity of the vehicle so that their mobile device can act as a virtual key and begin the reservation. That said, there is no safe guard to guarantee the vehicle's systems are in order for the vehicle to function properly and carry out the reservation as expected. This may lead to the consumer being without a vehicle at the time of reservation or, worse, a vehicle malfunction occurring during the reservation which leaves the consumer stranded at some remote location. Accordingly, it is desirable to provide a system and method for ensuring vehicle accessibility and reliability prior to a reservation and thus reducing the likelihood of vehicle malfunction during a reservation.

SUMMARY

A system to implement a vehicle-reservation reliability prognosis prior to a reservation is herein presented. The system includes a memory, controller, and vehicle. The memory is configured to have one or more executable instructions and one or more vehicle-share records. The controller is configured to execute the executable instructions and communicate with the vehicle-share records. The vehicle includes one or more vehicle systems configured to generate system function information and is configured to communicate with the controller. Moreover, the executable instructions enable the controller to: retrieve system function information from one or more vehicle systems of the vehicle; deliver the vehicle-reservation reliability prognosis based, at least in part, on the system function information; and modify the vehicle-share records based upon the vehicle-reservation reliability prognosis.

In one or more embodiments, the controller can be further configured to communicate with a service provider. In such embodiments, the executable instructions further enable the controller to: generate a notification based, at least in part, on the vehicle-reservation reliability prognosis; and communicate the notification to the service provider. The service provider may be a fleet manager or a field service technician.

In one or more embodiments, the executable instructions further enable the controller to: receive a vehicle system verification alert; and activate the retrieval of the system function information signaled by the system verification alert. The vehicle system verification alert may indicate that retrieval activation is to occur between the completion of a first reservation and the beginning of a second reservation, at some time duration after the previous vehicle-reservation reliability prognosis, when the vehicle engine is shut down at a substantially different vehicle location, when an anomaly is determined to have occurred in the first reservation, or upon a demand. The modification to the vehicle-share records may include generating new vehicle assignment information associated with a vehicle reservation account. The modification to the vehicle-share records may include an unavailable status indicator being provided to one or more vehicle-share vehicle records and reservation profile records.

The system function information may be location information and the vehicle system may be a GPS chipset/component. The system function information may be State of Charge information and the vehicle system may be a vehicle battery. The system function information may be automated driving information and the vehicle system may be an automated driving system. The system function information may incorporate vehicle health data and/or vehicle fuel data and the vehicle system is an engine control module, and/or the system function information may incorporate vehicle body data and the vehicle system may be a body control module, and/or the system function information may incorporate passive entry health information and the vehicle system may be a passive entry passive start module, and/or the system function information may incorporate immobilization health data and the vehicle system may be a vehicle immobilization module, and/or the system function information may incorporate Remote Vehicle Disable mode information and the vehicle system may be a telematics unit, and/or the system function information may incorporate wireless health information and the vehicle system may be a cellular component or wireless modem or both the cellular component and wireless modem.

In one or more embodiments, the controller is further configured to communicate with a weather services server configured to provide weather conditions information. In such embodiments, the executable instructions further enable the controller to: receive weather conditions information from the weather services server; and deliver the vehicle-reservation reliability prognosis being further based, at least in part, on the system function information being supported by the weather conditions information.

A method to implement a vehicle-reservation reliability prognosis prior to a reservation is also herein presented. The method includes the steps of: providing a memory configured to comprise one or more executable instructions, the memory further configured to comprise one or more vehicle-share records; providing a controller configured to execute the executable instructions, the controller further configured to communicate with the vehicle-share records; providing a vehicle comprising one or more vehicle systems configured to generate system function information, the vehicle configured to communicate with the controller; retrieving (via the controller) system function information from one or more vehicle systems of the vehicle; delivering (via the controller) the vehicle-reservation reliability prognosis based, at least in part, on the system function information; and modifying (via the controller) the vehicle-share records based upon the vehicle-reservation reliability prognosis.

In one or more method embodiments, the controller may be further configured to communicate with a service provider. In these embodiments, the method includes the steps of: generating (via the controller) a notification based, at least in part, on the vehicle-reservation reliability prognosis; and communicating (via the controller) the notification to the service provider. In one or more embodiments, the method includes the steps of: receiving (via the controller) a vehicle system verification alert; and activating (via the controller) the retrieval of the system function information signaled by the system verification alert.

In one or more method embodiments, the controller may be further configured to communicate with a weather services server configured to provide weather conditions information. In these embodiments, the method includes the steps of: receiving (via the controller) weather conditions information from the weather services server; and delivering (via the controller) the vehicle-reservation reliability prognosis being further based, at least in part, on the system function information being supported by the weather conditions information.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following detailed description is merely exemplary in nature and is not intended to limit the application and uses. Furthermore, there is no intention to be bound by any expressed or implied theory presented in the preceding background and brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
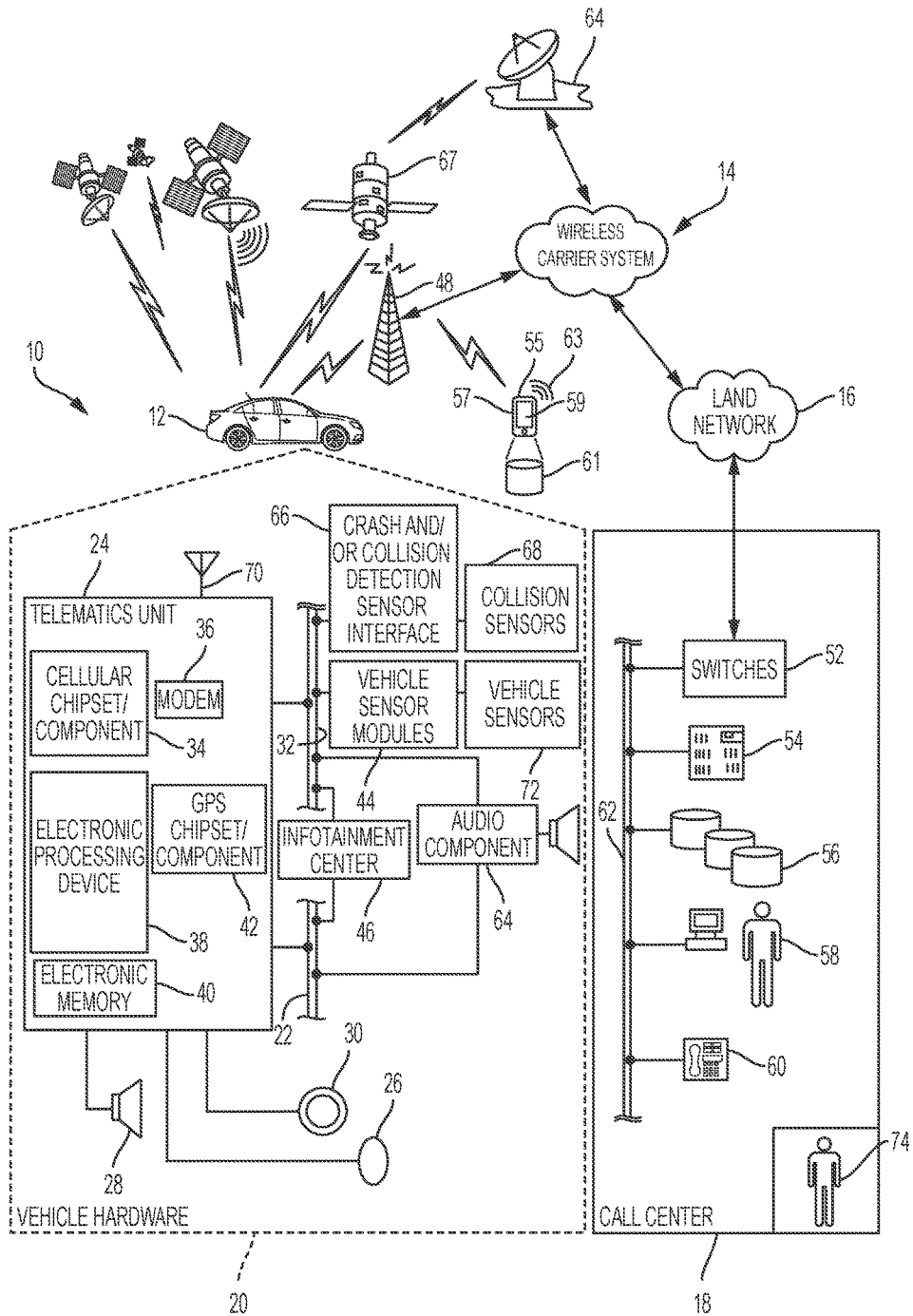
FIG. 1 is a block diagram depicting an exemplary embodiment of a communications system capable of utilizing the system and method disclosed herein.

As shown in FIG. 1, there is shown a non-limiting example of a communication system 10 that may be used together with examples of the apparatus/system disclosed herein or to implement examples of the methods disclosed herein. Communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of manually operated or autonomous vehicle such as a motorcycle, car, truck, bicycle, recreational vehicle (RV), boat, plane, etc., and is equipped with suitable hardware and software that enables it to communicate over communication system 10. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the fundamental vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is a communication system which provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42 capable of communicating location information via a GPS satellite system. GPS component 42 thus receives coordinate signals from a constellation 65 of GPS satellites. From these signals, GPS component 42 can determine vehicle position, which may be used for providing navigation and other position-related services to the vehicle operator. Navigation information can be presented on a display of telematics unit 24 (or other display within the vehicle) or can be presented verbally such as is done when supplying turn-by-turn navigation. The navigation services can be provided using a dedicated in-vehicle navigation module (which can be part of GPS chipset/component 42), or some or all navigation services can be done via telematics unit 24, wherein the location coordinate information is sent to a remote location for purposes of providing the vehicle with navigation maps, map annotations, route calculations, and the like.

The telematics unit 24 may provide various services including: turn-by-turn directions and other navigation-related services provided in conjunction with the GPS component 42; airbag deployment notification and other emergency or roadside assistance-related services provided in connection with various crash and/or collision sensor interface modules 66 and collision sensors 68 located throughout the vehicle; and/or comfort related assistance to adjust the vehicle seat and mirror positions that are provided in connection with various sensor interface modules 66; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services telematics unit 24 may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. The cellular component 34 and wireless modem 36 can moreover collaborate to provide wireless health information to ensure their proper functionality for voice communications and data transmissions. To accomplish this effect, dual mode antenna 70 services the GPS component 42 and the cellular component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to telematics unit 30 via the crash and/or collision detection sensor interface 66 regarding the severity of a vehicle collision, such as the angle of impact and the amount of force sustained.

Vehicle sensors 72, connected to various vehicle sensor modules 44 (VSMs) in the form of electronic hardware components located throughout vehicle 12 and use the sensed input to perform diagnostic, monitoring, control, reporting and/or other functions. Each of the VSMs 44 is preferably connected by vehicle bus 32 to the other VSMs, as well as to the telematics unit 24, and can be programmed to run vehicle system and subsystem diagnostic tests. As examples, one VSM 44 can be an engine control module (ECM) that controls various aspects of engine operation such as fuel ignition and ignition timing and another VSM 44 can be a powertrain control module (PCM) that regulates operation of one or more components of the powertrain system. According to one embodiment, the ECM is equipped with on-board diagnostic (OBD) features that provide myriad real-time vehicle health data, such as that received from various sensors including vehicle emissions sensors and vehicle oil sensors as well as provide a standardized series of diagnostic trouble codes (DTCs) which allow a technician to rapidly identify and remedy malfunctions within the vehicle. ECM can also be equipped with fuel tank diagnostics features that provide myriad real-time vehicle fuel data, such as fuel level information. Another VSM 44 can be a body control module (BCM) that governs various electrical components located throughout the vehicle and provide myriad real-time vehicle body data with respect to the vehicle's power door locks, tire pressure, lighting system, engine ignition, vehicle seat adjustment and heating, mirrors, and headlights. Another VSM 44 can be a vehicle immobilization module (VIM) that can provide immobilization health data and prevent the engine from being provided powered and thus immobilize vehicle 12.

A passive entry passive start (PEPS) module, for instance, is another of the numerous of VSMs and provides passive detection of the absence or presence of a passive physical key or a virtual vehicle key. When the passive physical key approaches, the PEPS module can determine if the passive physical key is authentic as belonging to the vehicle 12. The PEPS can likewise use authentication information received from data center 18 to determine if a mobile computing device 57 with virtual vehicle key is authorized/authentic to vehicle 12. If the virtual vehicle key is deemed authentic, the PEPS can send a command to BCM 44 permitting access to the vehicle 12. The PEPS can also provide passive entry health information to ensure sufficient module functionality for the passive physical key or virtual vehicle key operations. It should be understood that the PEPS may be an electronic hardware component connected to the vehicle bus 32 or, in an alternative embodiment, may be one or more software code segments uploaded to electronic memory 40.

Wireless carrier system 14 may be a cellular telephone system or any other suitable wireless system that transmits signals between the vehicle hardware 20 and land network 16. According to an example, wireless carrier system 14 includes one or more cell towers 48.

Land network 16 can be a conventional land-based telecommunications network connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

As revealed above, one of the networked devices that can directly or indirectly communicate with the telematics unit 24 is a mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a transceiver 53 capable of communicating with wireless carrier system 14, and/or a GPS module 63 capable of receiving GPS satellite signals and generating GPS coordinates based on those signals. Examples of the mobile computing device 57 include the iPhone™ and Apple Watch™ each being manufactured by Apple, Inc. and the Droid™ smart phone manufactured by Motorola, Inc. as well as others.

Mobile device 57 may be used inside or outside of a vehicle, and may be coupled to the vehicle by wire or wirelessly. The mobile device may also be configured to provide services according to a subscription agreement with a third-party facility or wireless/telephone service provider. It should be appreciated that various service providers may utilize the wireless carrier system 14 and that the service provider of telematics unit 30 may not necessarily be the same as the service provider of mobile device 57.

When using a short-range wireless connection (SRWC) protocol (e.g., Bluetooth Low Energy, Wi-Fi, etc.), mobile computing device 57 and telematics unit 24 may pair with each other (or link to one another) on a case-by-case basis and while within a wireless range; SRWC pairing is known to skilled artisans. The SRWC protocol may be an aspect of telematics unit 24 or may be part of one or more independent VSMs 44 such as the PEPS and/or BCM 44. Once SRWC is established, the devices may be considered bonded (i.e., they may recognize one another and/or connect automatically when they are in a predetermined proximity or range of one other. In other words—they may become, at least temporarily, network participants).

This unique pairing, for example, allows mobile computing device 57 to act as the virtual key fob briefly mentioned above. To illustrate for this to happen—upon receiving a request, data center 18 will generate an encrypted virtual vehicle key to permit vehicle access via mobile computing device 57. Data center 18 will then transmit aspects this encrypted virtual vehicle key information to both mobile computing device 57 and the PEPS module 44 via telematics unit 24. After paring has been established, mobile computing device 57 will send its virtual vehicle key aspect to telematics unit 24 for recognition in light of its stored corresponding virtual key aspect and in turn the PEPS module may establish mobile computing device 57 as the key fob for vehicle 12. Data center 18 may also transmit one or more time parameters with the encrypted virtual vehicle key information so as to temporarily establish the virtual vehicle key of mobile device 57.

Call center 18 is designed to provide the vehicle hardware 20 with a number of different system backend functions and, according to the example shown here, generally includes one or more switches 52, servers 54, databases 56, advisors 58, one or more fleet managers and field service technicians 74, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58, fleet manager/field service technician 74, or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56.

The fleet manager 74 may be delegated assignments by data center 18 and may be remotely located therefrom. The responsibilities of fleet manager 74 include tasks such as, but not limited to, fleet rotation oversight, vehicle system malfunction/damage assessment, and dealing with various customer-related situations. For example, data center 18 will notify fleet manager 74 when a fleet vehicle malfunctions and fleet manager 74 will arrive at the scene to assess vehicle 12 and determine the specific malfunction type. The field service technician 74 responsibilities include tasks such as, but not limited to, correcting vehicle system malfunction/damage issues and providing fuel to stranded vehicles. For example, the fleet manager may assess vehicle malfunction/damage and then request a field service technician 74 arrive at the scene to conduct vehicle maintenance and return the vehicle to its optimal condition. In another example, field service technician 74 may be sent by data center 18 to provide gasoline to a remotely located vehicle which has become stranded after running empty.

Server 54 can incorporate a data controller which essentially controls the operations of server 54. Server 54 may control data information as well as act as a transceiver to send and/or receive the data information (i.e., data transmissions) from one or more of the databases 54, telematics unit 24, and mobile computing device 57. The controller is moreover capable of reading executable instructions stored in a non-transitory machine readable medium and may include one or more from among a processor, microprocessor, central processing unit (CPU), graphics processor, Application Specific Integrated Circuits (ASICs), Field-Programmable Gate Arrays (FPGAs), state machines, and a combination of hardware, software, and firmware components.

Database 56 could be designed to store an API suite incorporating numerous vehicle-share services records (i.e., vehicle reservation information) each having information related to vehicle 12 such as, but not limited to, vehicle-share vehicle records (e.g., vehicle VSM information, vehicle system verification information/alerts, vehicle anomaly information), information related to the user such as, but not limited to, reservation account records (e.g., vehicle comfort settings information, driving record information, telematics unit settings, or vehicle make-model preferences), and information related to organizing vehicle reservations as well as fleet management such as, but not limited to, reservation profile records (e.g., reservation calendar information, vehicle assignment information, parking information, third party contact information, etc.); or any other pertinent vehicle-share system information. This stored backend information could moreover be written in SQL. In certain instances, this vehicle-share services records information may be accessible to the user, data center 18, or one or more third parties (e.g., fleet manager 74) and can moreover be copied, organized, and/or stored in a tabular form to allow for continuous, real-time updates. The vehicle-share records can additionally collaborate with a reservation account (discussed below) for support of, for example, reservation management and fleet management.

As revealed above, the user of mobile computing device 57 may create their own personalized vehicle-share services reservation account ("reservation account") to be stored in mobile memory 61 and which may have access to the vehicle-share records at the backend. The user may perform tasks to create this account through a variety of frontend devices such as through a remote computer and mobile computing device 57 or through live advisor 86 at call center 20. This reservation account may be uploaded to or accessible on server 82 (i.e., to support backend functions). Call center 20 may also access one or more additional remote servers and/or remote databases (e.g., Department of Motor Vehicles, weather databases, traffic databases, etc.) to receive information in support of a particular reservation, reservation account, and one or more vehicle-share services records.

The reservation account may include validating data to verify and/or validate that future login attempts are secure (e.g., granting access only to the user). The validating data may include an account username and account password as well as user information (e.g., driver's license information), mobile computing device information such as, for example, the unique mobile device identifier (i.e., serial number). The user account may additionally store a variety of user preferences.

The user of mobile device 57 may visit an online software application store or web-service and download the reservation account therefrom. The reservation account may moreover include one or more prompts to instruct the user to provide information (e.g., validating data) to support account creation. Reservation account may be configured to assist a vehicle-share system user in reserving a fleet vehicle by operatively accessing and communicating with the backend vehicle-share services records.

Although the illustrated example has been described as it would be used in conjunction with a manned call center 18, it will be appreciated that the call center 18 can be any central or remote facility, manned or unmanned, mobile or fixed, to or from which it is desirable to exchange voice and data.

Figure 2:
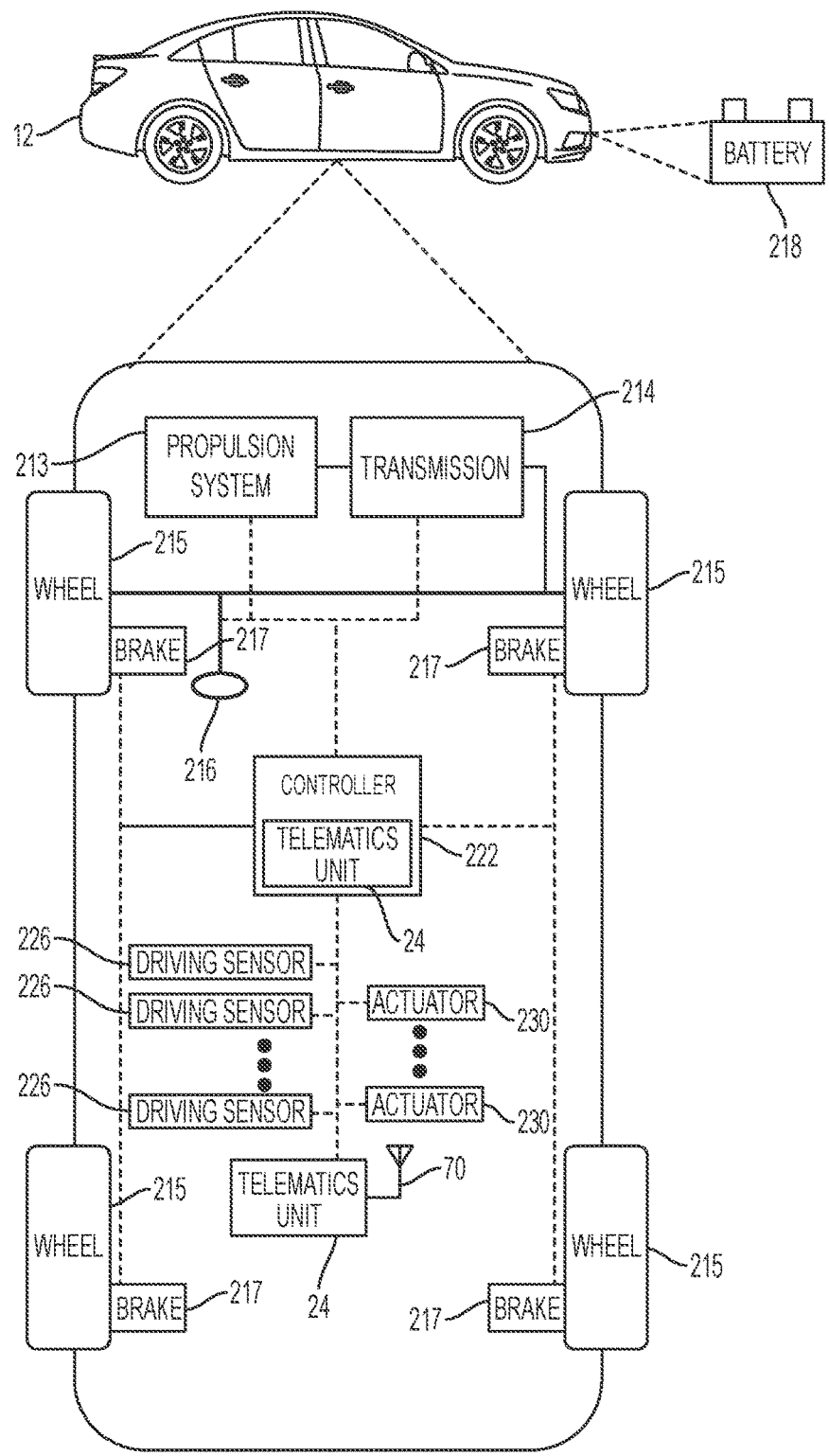
FIG. 2 is a schematic diagram of an autonomously controlled vehicle, according to an embodiment of the communications system of FIG. 1.

As shown in FIG. 2, communication system 10 may incorporate one or more embodiments of vehicle 12 being autonomous in nature. With such embodiments, in addition to the systems discussed above, vehicle 12 further includes a transmission 214 configured to transmit power from the propulsion system 213 to a plurality of vehicle wheels 215 according to selectable speed ratios. According to various embodiments, the transmission 214 may include a step-ratio automatic transmission, a continuously-variable transmission, or other appropriate transmission. The vehicle 12 additionally includes wheel brakes 217 configured to provide braking torque to the vehicle wheels 215. The wheel brakes 217 may, in various embodiments, include friction brakes, a regenerative braking system such as an electric machine, and/or other appropriate braking systems.

The vehicle 12 additionally includes a steering system 216. While depicted as including a steering wheel for illustrative purposes, in some embodiments contemplated within the scope of the present disclosure, the steering system 16 may not include a steering wheel. The vehicle 12 further includes a battery 218 that supplies electric power to other vehicle systems (e.g., powertrain system). Battery 218 may be connected to vehicle bus 32 to communicate with one or more VSMs 44. For example, OBD 44 may provide the State of Charge (SoC) based on information it receives from one or more battery read sensors. Skilled artisans will understand embodiments of battery 218 are generally known to be incorporated into vehicle embodiments which are not autonomous.

Telematics unit 24 is moreover configured to wirelessly communicate with other vehicles ("V2V") and/or infrastructure ("V2I") and/or pedestrians ("V2P"). These communications may collectively be referred to as a vehicle-to-entity communication ("V2X"). In an exemplary embodiment, in addition to the communication channels listed above, this communication system is further configured to communicate via at least one dedicated short-range communications (DSRC) channel. DSRC channels refer to one-way or two-way short-range to medium-range wireless communication channels specifically designed for automotive use and a corresponding set of protocols and standards.

The propulsion system 213, transmission 214, steering system 216, and wheel brakes 217 are in communication with or under the control of at least one controller 222. While depicted as a single unit for illustrative purposes, the controller 222 may additionally include one or more other controllers, collectively referred to as a "controller." The controller 222 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 222 in controlling the vehicle.

Controller 222 includes an automated driving system (ADS) 224 for automatically controlling various actuators in the vehicle. In an exemplary embodiment, ADS 224 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 224 is configured to communicate automated driving information with and control propulsion system 213, transmission 214, steering system 216, and wheel brakes 217 to control vehicle acceleration, steering, and braking, respectively, without human intervention via a plurality of actuators 30 in response to inputs from a plurality of driving sensors 226, which may include GPS, RADAR, LIDAR, optical cameras, thermal cameras, ultrasonic sensors, and/or additional sensors as appropriate.

Figure 3:
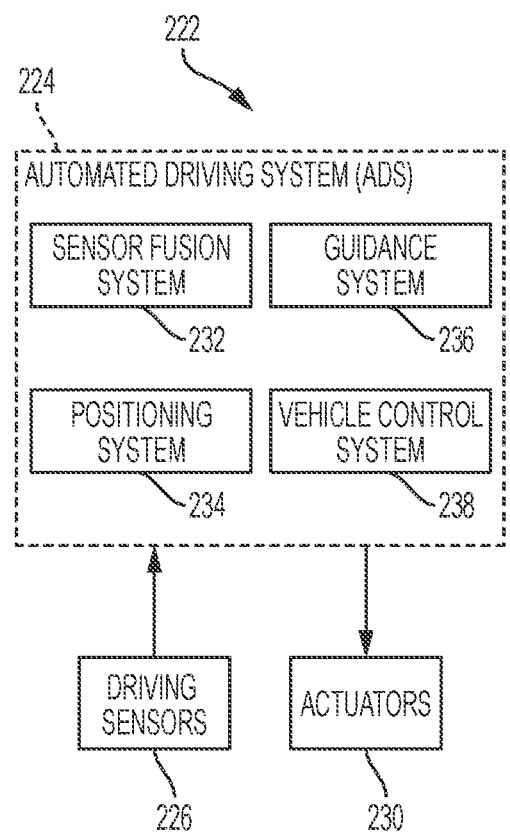
FIG. 3 is a schematic block diagram of an exemplary automated driving system (ADS) for the vehicle of FIG. 2.

In various embodiments, the instructions of the ADS 224 may be organized by function or system. For example, as shown in FIG. 3, ADS 224 can include a sensor fusion system 232 (computer vision system), a positioning system 234, a guidance system 236, and a vehicle control system 238. As can be appreciated, in various embodiments, the instructions may be organized into any number of systems (e.g., combined, further partitioned, etc.) as the disclosure is not limited to the present examples.

In various embodiments, the sensor fusion system 232 synthesizes and processes sensor data and predicts the presence, location, classification, and/or path of objects and features of the environment of the vehicle 12. In various embodiments, the sensor fusion system 232 can incorporate information from multiple sensors, including but not limited to cameras, LIDARS, radars, and/or any number of other types of sensors. In one or more exemplary embodiments described herein, the sensor fusion system 232 supports or otherwise performs the ground reference determination processes and correlates image data to LIDAR point cloud data, the vehicle reference frame, or some other reference coordinate frame using calibrated conversion parameter values associated with the pairing of the respective camera and reference frame to relate LIDAR points to pixel locations, assign depths to the image data, identify objects in one or more of the image data and the LIDAR data, or otherwise synthesize associated image data and LIDAR data. In other words, the sensor output from the sensor fusion system 232 provided to the vehicle control system 238 (e.g., indicia of detected objects and/or their locations relative to the vehicle 10) reflects or is otherwise influenced by the calibrations and associations between camera images, LIDAR point cloud data, and the like.

The positioning system 234 processes sensor data along with other data to determine a position (e.g., a local position relative to a map, an exact position relative to lane of a road, vehicle heading, velocity, etc.) of the vehicle 12 relative to the environment. The guidance system 236 processes sensor data along with other data to determine a path for the vehicle 12 to follow (i.e., path planning data). The vehicle control system 238 generates control signals for controlling the vehicle 12 according to the determined path.

In various embodiments, the controller 222 implements machine learning techniques to assist the functionality of the controller 222, such as feature detection/classification, obstruction mitigation, route traversal, mapping, sensor integration, ground-truth determination, and the like.

The output of controller 222 is communicated to actuators 230. In an exemplary embodiment, the actuators 230 include a steering control, a shifter control, a throttle control, and a brake control. The steering control may, for example, control a steering system 216 as illustrated in FIG. 2. The shifter control may, for example, control a transmission 214 as illustrated in FIG. 2. The throttle control may, for example, control a propulsion system 213 as illustrated in FIG. 2. The brake control may, for example, control wheel brakes 217 as illustrated in FIG. 2.

Vehicle-Reservation Reliability Prognosis

Figure 4A:
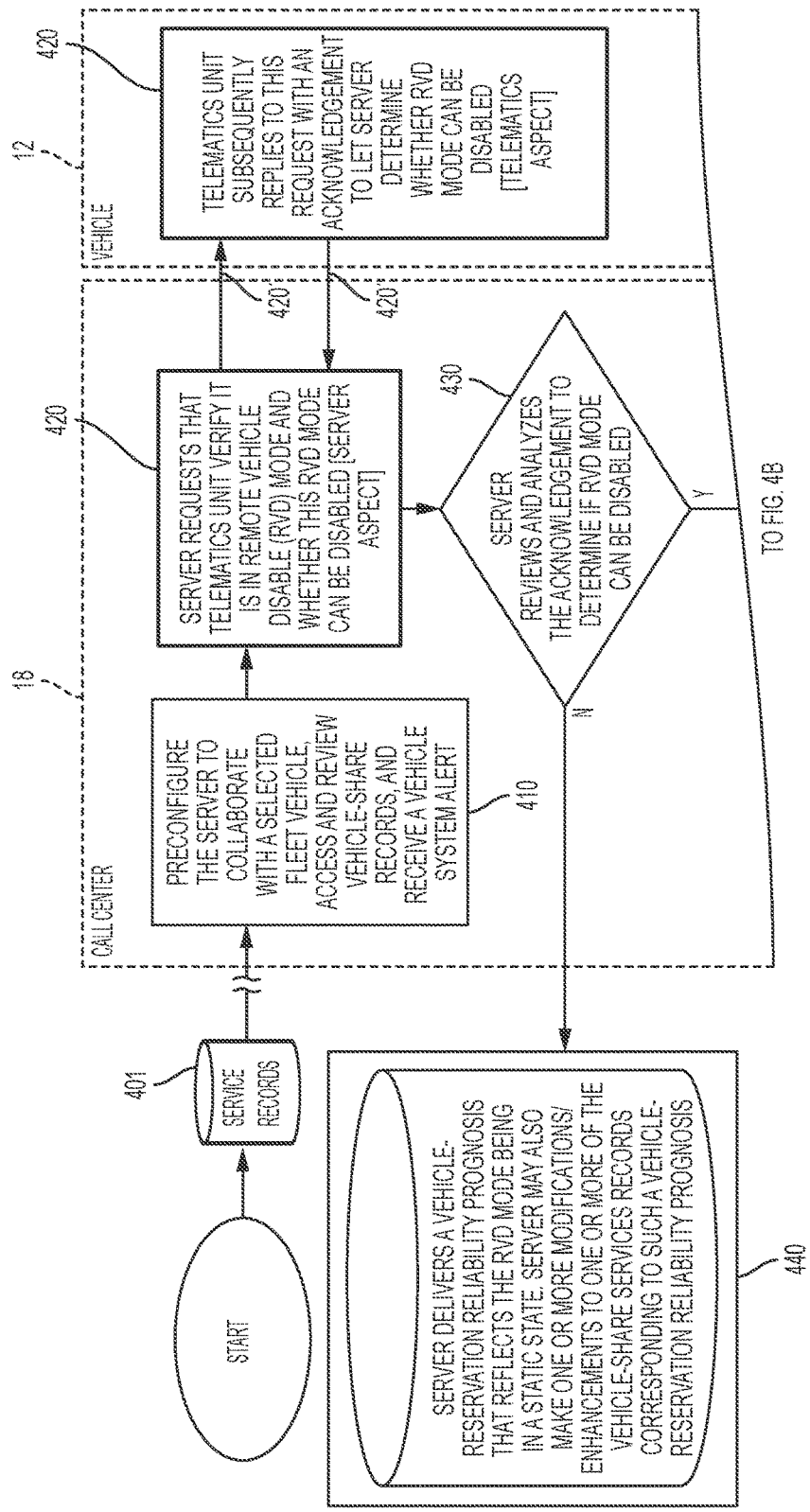
FIG. 4A is a first portion of an exemplary flow chart for utilization of the system and method aspects disclosed herein.
Figure 4B:
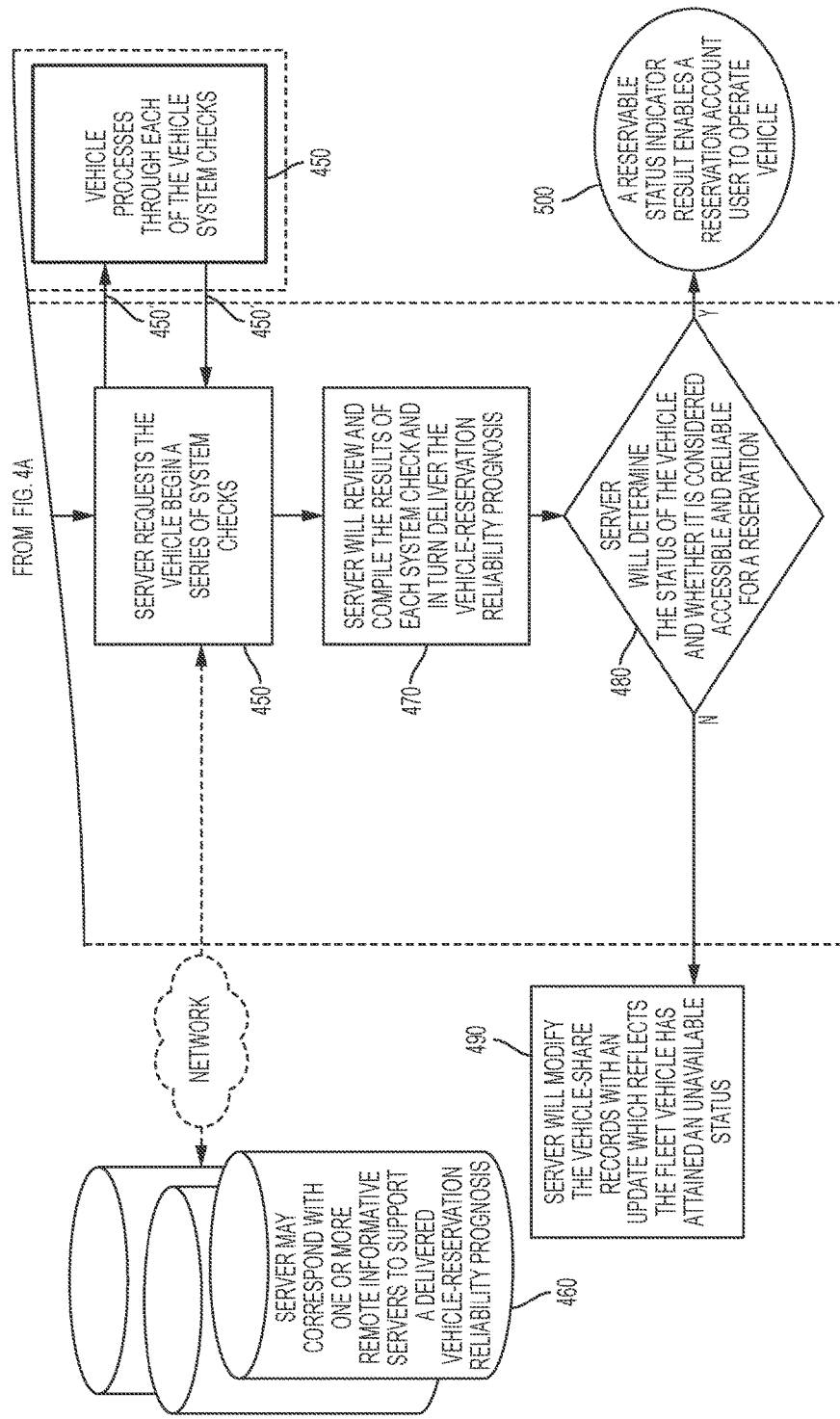
FIG. 4B is a second portion of the exemplary flow chart for utilization of the system and method aspects disclosed herein.

Referring to FIG. 4, implementation of a vehicle-reservation reliability prognosis, prior to a reservation window of operation, is supported by a user operating their reservation account to request a reservation. This reservation information is then sent to one or more of the vehicle-share records for updates thereto. At the backend, server 54 will collaborate with database 56 and one or more of the vehicle-share services records 401 (e.g., reservation profile records) to establish a subset of the fleet available during a requested reservation window of operation. To illustrate, server 54 can manage the use of a fleet of ten (10) vehicles at a selected location and determine that four (4) of those vehicles will be available during the requested reservation times. Server 54 will then select one of those vehicles 12 using a vehicle identifier and assign that identifier to the reservation account, corresponding vehicle-share records, and user for use during the requested reservation. As vehicles are requested and used, server 54 can determine the identities of the vehicles currently in use and monitor upcoming reservation windows associated with those fleet vehicles so as to understand which vehicles are available at any particular time. This monitoring process may thus be conducted through review of one or more vehicle-share records.

At some point prior to a reservation window of operation, in step 410, server 54 is preconfigured to collaborate with the selected fleet vehicle 12 to verify that its essential vehicle systems are sufficiently functional in order to ensure that vehicle 12 will have no accessibility or reliability problems during the reservation. Server 54 is also preconfigured to access and review one or more vehicle-share records (vehicle-share vehicle records) and automatically receive a vehicle system verification alert, which signals and activates server 54 to begin the processes of retrieving system function information (e.g., vehicle sensor information) after a series of vehicle system checks. The vehicle system verification alert may otherwise be pushed to server 54 through the auspices of one or more software modules stored in databases 56. Once this verification process is complete, server 54 is further preconfigured to compile the system check results and subsequently deliver a vehicle-reservation reliability prognosis to be stored in and modify one or more of the vehicle-share records.

The vehicle system verification alert may specifically be provided to the corresponding vehicle-share vehicle record between the completion of a previous reservation (first reservation) and current reservation window of operation (second reservation); and/or it may be set to occur at some time after the previous verification process; and/or it may occur when the vehicle engine has been shut down at a remote location; and/or it may occur when an anomaly is determined to have occurred during the previous reservation; and/or the verification may occur on the demand of call center 18 or service provider (e.g., fleet manager). For example, the alert may be provided to occur and cause system checks every 36 hours or the soonest time thereafter to transpire upon the completion of a first reservation. In another example, the alert may occur after the completion of a reservation in which one or more of the crash sensors 66 indicates the incidence of a vehicle collision (anomaly). In yet another example, the live advisor 58 or server 54 may recognize a substantial amount of time has passed since the previous prognosis delivery and therefore order an alert to occur. In a similar example, a fleet manager may have a policy that call center 18 deliver a prognosis at certain times/events throughout a year. In yet a further example, telematics unit 24 may send a signal to server 54 which indicates when the vehicle's engine has been shut down (i.e., when the ignition is turned to an OFF state) and GPS component 42 recognizes that the vehicle position is substantially different from the position where the vehicle engine was powered on (i.e., during a vehicle reservation trip); as a result, server 54 may be programmed to automatically order an alert to occur.

In step 420, which occurs as an interaction between call center 18 and vehicle 12, server 54 performs precursory long range communication inquiries of telematics unit 24. In this step, server 54 will transmit a command 420' to wakeup telematics unit 24 from a sleep state. This command 420' will additionally request that telematics unit 24 verify it is currently in Remote Vehicle Disable mode (a remote API capability that can be enabled to prevent the vehicle engine from ignition or the vehicle from being moved) and such mode can be properly deactivated upon command to enable normal vehicle operation. Telematics unit 24 will subsequently reply to this command with acknowledgement information to let server 54 determine whether Remote Vehicle Disable mode can be properly disabled (unset).

In step 430, server 54 will review and analyze the acknowledgement. If Remote Vehicle Disable mode cannot be disabled, in step 440, server 54 will deliver a vehicle-reservation reliability prognosis (e.g., version 1), which reflects the mode being in a static state. Server 54 may also generate a notification (e.g., text message) based off that vehicle-reservation reliability prognosis and transmit that notification to a local vehicle-share system service provider (e.g., fleet manager). This allows the agent to know to visit vehicle 12 or its designated parking space, for example, to confirm that vehicle 12 has not been tampered with or unlawfully removed from the parking space. Server 54 may also transmit the notification to the field service technician 74. This allows the service provider to visit vehicle 12 and assess its condition and/or conduct maintenance to correct the problems with the non-functional remote API. This may also, in situations a tow service is used, allow vehicle 12 to be removed from its location and a fully functional vehicle be placed at that location.

In step 440, furthermore, server 54 may also make one or more modifications/enhancements to one or more of the vehicle-share services records corresponding to such a vehicle-reservation reliability prognosis. For instance, server 54 may generate new vehicle assignment information associated with the vehicle reservation account corresponding to any/all subsequent (second) reservations for the disabled vehicle. As such, a user may be assigned a new vehicle which may be in proximity to their originally assigned vehicle. Server 54 may additionally provide an unavailable status indicator to the vehicle-share services reservation account records and reservation profile records. Unavailable status may place a hold or otherwise bar any amendments/updates to the vehicle-share services records (e.g., reservation calendar information) associated with the vehicle. For instance, new reservations of the vehicle will not be permitted until the status has been changed. In this step, server 54 may also generate a corresponding notification and transmit that notification to a service provider or to mobile computing device 57.

If Remote Vehicle Disable mode is fully operational, server 54 will skip step 440 and move directly to step 450 to request vehicle 12 begin the series of vehicle system checks. Step 450, likewise, includes vehicle 12 processing through each of these vehicle system checks. The checks may incorporate information such as, but not limited to: location information from the GPS component 44 (so as to ensure proper vehicle tracking during the reservation window of operation and ensure the vehicle has been returned to the proper parking location at the reservation conclusion), State of Charge information from the vehicle battery, vehicle body data (information regarding: tire pressure, lighting system, engine ignition, vehicle seat, mirrors, headlights, power door locks, etc.), vehicle health data (vehicle oil information, etc.), vehicle fuel data, any DTC information from the ECM 44, electrical componentry information from the BCM 44, immobilization health data from VIM 44, wireless health information from the cellular component and/or wireless modem, and/or passive entry health information from PEPS module 44 (e.g., to ensure lock/unlock/remote horn commands can be generated and acknowledged, to ensure remote keyless is operational, to ensure SRWC protocol functionality through self-diagnosis, etc.). Moreover, in those embodiments in which vehicle 12 is autonomous, such information may further include automated driving information from ADS 224. For example, ADS 224 may reflect data processing glitches with sensor fusion system 232, for example, technical failures with receiving information from any one of the sensors (e.g., the cameras, LIDARS, radars, etc.) which could render one or more aspects of sensor fusion system 232 ineffective.

In optional step 460, server 54 may correspond with one or more remote informative servers to support a delivered vehicle-reservation reliability prognosis. For example, in those embodiments in which vehicle 12 is autonomous, a weather services server may be contacted to determine if automated vehicle operations can be supported under predicted/current weather conditions throughout the established reservation times. Informative server may also, for example, be a Department of Motor Vehicles server which has been contacted to ensure vehicle 12 does not have unexpected parking citations against it or to ensure the reservation account information for the upcoming reservation window or operation does not reflect the user is unable to legally operate vehicle 12.

Upon vehicle 12 producing the vehicle system check information, server 54 will review and compile the results of each system check and in turn deliver the vehicle-reservation reliability prognosis (version 2), in step 470. This prognosis may simply be embodied as a report summarizing each conducted system check and the corresponding pass/fail results. The prognosis may also be embodied as a score based on aggregated pass/fail results for the system checks. In step 480, server 54 will determine the status of vehicle 12 and whether it is considered accessible and reliable for a reservation. As such, when the outcome of the vehicle-reservation reliability prognosis produces an unavailable status indicator, due to vehicle 12 being considered inaccessible and unreliable, server 54 will move to step 490.

When the vehicle-reservation reliability prognosis produces a reservable status indicator (i.e., when at least the minimum number of system check results are considered passing), server 54 should determine vehicle 12 is in proper condition for reservation for at least the subsequent reservation. This result may also cause server 54 to modify one or more vehicle-share records with an update which reflects that the specific vehicle-reservation reliability prognosis reflects passing system checks. Server 54 may also access the reservation account corresponding to this reservation. For example, server 54 may take vehicle comfort settings information from the reservation account records and provide it to modify other vehicle-share services records or provide it directly to vehicle 12 to reconfigure the vehicle seat and mirror positions. In another example, server 54 may similarly take telematics unit settings information to update the unique mobile device identifier information or SRWC pairing information stored in electronic memory 40 of the assigned vehicle. This reservable status indicator result further enables the reservation account user to operate vehicle 12 during the reservation window of operation, in step 500.

In step 490, when an unavailable status indicator, discussed above, has been produced, server 54 will modify one or more vehicle-share records with an update which reflects the fleet vehicle has attained an unavailable status. This modification may include information regarding the specific failed system check of the vehicle-reservation reliability prognosis. For instance, server 54 may generate new vehicle assignment information associated with the vehicle reservation account corresponding to any/all subsequent reservations. In those embodiments having an autonomous vehicle, server 54 may generate new vehicle assignment information which provides the user with a non-autonomous vehicle 12 (e.g., due to bad weather conditions that do not enable the vehicle to operate within its specified operational domains). In this step, server 54 may also generate a notification and transmit that notification to a service provider such as a fleet manager or technician service provider, as discussed above (step 430) or to mobile computing device 57.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system to implement a vehicle-reservation reliability prognosis prior to a reservation, the system comprising:
a memory configured to comprise one or more executable instructions, the memory further configured to comprise one or more vehicle-share records;
a controller configured to execute the executable instructions, the controller further configured to communicate with the vehicle-share records;
a vehicle comprising one or more vehicle systems configured to generate system function information, the vehicle configured to communicate with the controller;
wherein the executable instructions enable the controller to:
receive a vehicle system verification alert, wherein the vehicle system verification alert indicates that retrieval activation is to occur between completion of a first reservation and beginning of a second reservation, at some time duration after a previous vehicle-reservation reliability prognosis, when the vehicle engine is shut down at a different vehicle location, when an anomaly is determined to have occurred in the first reservation, or upon a demand;
retrieve system function information from one or more vehicle systems of the vehicle based, at least in part, on the vehicle system verification alert;
deliver the vehicle-reservation reliability prognosis based, at least in part, on the system function information; and
modify the vehicle-share records based upon the vehicle-reservation reliability prognosis.

2. The system of claim 1, wherein:
the controller is further configured to communicate with a service provider; and
wherein the executable instructions further enable the controller to:
generate a notification based, at least in part, on the vehicle-reservation reliability prognosis; and
communicate the notification to the service provider.

3. The system of claim 2, wherein the service provider is a fleet manager or a field service technician.

4. The system of claim 1, wherein the modification to the vehicle-share records comprises generating new vehicle assignment information associated with a vehicle reservation account.

5. The system of claim 1, wherein the modification to the vehicle-share records comprises an unavailable status indicator being provided to one or more vehicle-share vehicle records and reservation profile records.

6. The system of claim 1, wherein the system function information is location information and the vehicle system is a GPS chipset/component.

7. The system of claim 1, wherein the system function information is State of Charge information and the vehicle system is a vehicle battery.

8. The system of claim 1, wherein the system function information is automated driving information and the vehicle system is an automated driving system.

9. The system of claim 1, wherein the system function information incorporates vehicle health data and/or vehicle fuel data and the vehicle system is an engine control module, and/or the system function information incorporates vehicle body data and the vehicle system is a body control module, and/or the system function information incorporates passive entry health information and the vehicle system is a passive entry passive start module, and/or the system function information incorporates immobilization health data and the vehicle system is a vehicle immobilization module, and/or the system function information incorporates Remote Vehicle Disable mode information and the vehicle system is a telematics unit, and/or the system function information incorporates wireless health information and the vehicle system is a cellular component or wireless modem or both the cellular component and wireless modem.

10. The system of claim 1, wherein:
the controller is further configured to communicate with a weather services server configured to provide weather conditions information; and
wherein the executable instructions further enable the controller to:
receive weather conditions information from the weather services server; and
deliver the vehicle-reservation reliability prognosis being further based, at least in part, on the system function information being supported by the weather conditions information.

11. A method to implement a vehicle-reservation reliability prognosis prior to a reservation, the method comprising:
providing a memory configured to comprise one or more executable instructions, the memory further configured to comprise one or more vehicle-share records;
providing a controller configured to execute the executable instructions, the controller further configured to communicate with the vehicle-share records;
providing a vehicle comprising one or more vehicle systems configured to generate system function information, the vehicle configured to communicate with the controller;
receiving, via the controller, a vehicle system verification alert, wherein the vehicle system verification alert indicates that retrieval activation is to occur between completion of a first reservation and beginning of a second reservation, at some time duration after a previous vehicle-reservation reliability prognosis, when the vehicle engine is shut down at a different vehicle location, when an anomaly is determined to have occurred in the first reservation, or upon a demand;
retrieving, via the controller, system function information from one or more vehicle systems of the vehicle based, at least in part, on the vehicle system verification alert;
delivering, via the controller, the vehicle-reservation reliability prognosis based, at least in part, on the system function information; and
modifying, via the controller, the vehicle-share records based upon the vehicle-reservation reliability prognosis.

12. The method of claim 11, wherein:
the controller is further configured to communicate with a service provider;
generating, via the controller, a notification based, at least in part, on the vehicle-reservation reliability prognosis; and
communicating, via the controller, the notification to the service provider.

13. The method of claim 12, wherein the service provider is a fleet manager or a field service technician.

14. The method of claim 11, wherein the modification to the vehicle-share records comprises generating new vehicle assignment information associated with a vehicle reservation account.

15. The method of claim 11, wherein the system function information is automated driving information and the vehicle system is an automated driving system.

16. The method of claim 11, wherein the system function information incorporates vehicle health data and/or vehicle fuel data and the vehicle system is an engine control module, and/or the system function information incorporates vehicle body data and the vehicle system is a body control module, and/or the system function information incorporates passive entry health information and the vehicle system is a passive entry passive start module, and/or the system function information incorporates immobilization health data and the vehicle system is a vehicle immobilization module, and/or the system function information incorporates Remote Vehicle Disable mode information and the vehicle system is a telematics unit, and/or the system function information incorporates wireless health information and the vehicle system is a cellular component or wireless modem or both the cellular component and wireless modem.

17. The method of claim 11, wherein:
the controller is further configured to communicate with a weather services server configured to provide weather conditions information;
receiving, via the controller, weather conditions information from the weather services server; and
delivering, via the controller, the vehicle-reservation reliability prognosis being further based, at least in part, on the system function information being supported by the weather conditions information.

18. A method to implement a vehicle-reservation reliability prognosis prior to a reservation window of operation, the method comprising:
providing a memory configured to comprise one or more executable instructions, the memory further configured to comprise one or more vehicle-share records;
providing a controller configured to execute the executable instructions, the controller further configured to communicate with the vehicle-share records and a service provider, wherein the service provider is a fleet manager or a field service technician;
providing a vehicle comprising one or more vehicle systems configured to generate system function information, the vehicle configured to communicate with the controller;
receiving, via the controller, a vehicle system verification alert, wherein the vehicle system alert indicates that retrieval activation is to occur between completion of a first reservation and beginning of a second reservation, at some time duration after a previous vehicle-reservation reliability prognosis, when the vehicle engine is shut down at a different vehicle location, when an anomaly is determined to have occurred in the first reservation, or upon a demand;
retrieving, via the controller, system function information from one or more vehicle systems of the vehicle based, at least in part, on the vehicle system verification information, wherein the system function information incorporates location information from a GPS component, State of Charge information from a vehicle battery, immobilization health data from the vehicle immobilization module, vehicle health data and/or vehicle fuel data from an engine control module (ECM), vehicle body data from a body control module (BCM), module health information from a passive entry passive start module (PEPS), and wireless health information from either a cellular component or wireless modem or both the cellular component and wireless modem;
delivering, via the controller, the vehicle-reservation reliability prognosis based, at least in part, on the system function information;

modifying, via the controller, the vehicle-share records when the vehicle-reservation reliability prognosis results in an unavailable status for the vehicle, wherein the modification of the vehicle-share records comprises generating new vehicle assignment information associated with a vehicle reservation account and providing an unavailable status indicator to one or more of the vehicle-share vehicle records and reservation profile records;

generating, via the controller, a notification based, at least in part, on the vehicle-reservation reliability prognosis; and communicating, via the controller, the notification to the service provider.

* * * * *